United States Patent [19]

Kaneko

[11] Patent Number: 4,903,209

[45] Date of Patent: Feb. 20, 1990

[54] HEIGHT CONTROL SYSTEM IN AUTOMOTIVE SUSPENSION SYSTEM PERFORMING ATTITUDE CHANGE SUPPRESSIVE CONTROL AND HEIGHT REGULATING CONTROL WITH HIGH RESPONSE CHARACTERISTICS IN HEIGHT ADJUSTMENT

[75] Inventor: Akira Kaneko, Kanagawa, Japan

[73] Assignee: Nissan Motor Company, Limited, Yokohama, Japan

[21] Appl. No.: 258,731

[22] Filed: Oct. 17, 1988

[30] Foreign Application Priority Data

Oct. 19, 1987 [JP] Japan ................................ 62-265153

[51] Int. Cl.[4] .............................................. B60G 17/00
[52] U.S. Cl. ............................... 364/424.05; 280/707; 280/DIG. 1
[58] Field of Search .................... 364/424.05; 280/707, 280/840, 703, DIG. 1, 772

[56] References Cited

U.S. PATENT DOCUMENTS

| 4,568,096 | 2/1986 | Yew et al. ........................... 280/707 |
| 4,712,807 | 12/1987 | Kurosawa ....................... 364/424.05 |
| 4,761,022 | 8/1988 | Ohashi et al. ....................... 280/703 |
| 4,765,649 | 8/1988 | Ikemoto et al. ..................... 280/707 |
| 4,821,191 | 4/1989 | Ikemoto et al. ..................... 280/707 |

*Primary Examiner*—Gary Chin
*Attorney, Agent, or Firm*—Foley & Lardner, Schwartz, Jeffery, Schwaab, Mack, Blumenthal & Evans

[57] ABSTRACT

An automotive suspension system can provide higher response characteristics in height adjustment. The height control system detects occurrence of vehicular load change, such as boarding and unboarding of passenger or passengers. The system also detects variation of vehicular height output of a predetermined range. When the vehicular height variation to be output of the predetermined range is detected at the occurrence of the load change, the system becomes active to temporarily adjust the vehicular height according to a preset schedule and maintains the vehicular height at adjusted position for a given period of time.

9 Claims, 4 Drawing Sheets

HEIGHT CONTROL SYSTEM IN AUTOMOTIVE SUSPENSION SYSTEM PERFORMING ATTITUDE CHANGE SUPPRESSIVE CONTROL AND HEIGHT REGULATING CONTROL WITH HIGH RESPONSE CHARACTERISTICS IN HEIGHT ADJUSTMENT

BACKGROUND OF THE INVENTION

1. Field of the Invention

The present invention relates generally to a vehicular height control system for an automotive suspension system. More specifically, the invention relates to an automotive height control system which is designed for performing vehicular attitude control for suppressing attitude change of a vehicular body and height regulating control for maintaining a vehicular height within a predetermined height range. Further particularly, the invention relates to an automotive height control system which is provided improved response characteristics in height adjustment in response to vehicular body displacement out of the target height range.

2. Description of the Background Art

Conventional automotive height control systems are provided pneumatic chambers variable of pneumatic pressure for adjusting pneumatic spring force for maintaining the vehicular height at a predetermined height range. Among such vehicular height control systems, some systems are associated with variable damping force suspension systems which are variable of suspension characteristics for absorbing road shock and for suppressing vehicular attitude change.

In such conventional vehicular height control systems, height adjustment tends to be disabled in response to attitude change since attitude change may cause temporary vehicular height variation to make it impossible to obtain precise vehicular height data. It is normal suspension procedure to give higher priority for attitude change suppressing operation than height regulating operation so that height adjustment is performed after vehicular attitude is stabilized. This clearly degrade response characteristics of height regulating operation in response to vehicular height variation due to change of load, such as upon getting in of the passenger or passengers, or upon getting out of the passenger or passengers since stability of the vehicular attitude has to be confirmed in advance of performing height regulating operation.

SUMMARY OF THE INVENTION

Therefore, it is an object of the present invention to provide a height control system of an automotive suspension system which can solve the problem in the conventional air and can provide higher response characteristics in height adjustment.

In order to accomplish aforementioned and other objects, a height control system, according to the present invention, detects occurrence of vehicular load change, such as boarding and unboarding of passenger or passengers. The system also detects variation of vehicular height output of a predetermined range. When the vehicular height variation to be output of the predetermined range is detected at the occurrence of the load change, the system becomes active to temporarily adjust the vehicular height according to a preset schedule and maintaines the vehicular height at adjusted position for a given period of time.

In the practical control, boarding and unboarding is practically distinguished for determining adjusting direction of the vehicular height between UP direction and DOWN direction. Furthermore, in the preferred process, the height adjustment is normally performed while the stable condition of the vehicular attitude. However, when both of occurrence of the load change vehicular height variation to be output of the predetermined range are simultaneously detected, height control is performed irrespective of the vehicular attitude change.

According to one aspect of the invention, an automotive height control system comprises:

a suspension mechanism interposed between a vehicle body and a suspension member which rotatably supports a vehicular wheel and including a pressure chamber variable of a pressure of pressure medium therewithin for adjusting relative distance between the vehicle body and the suspension member;

a pressure source circuit connected to the pressure chamber of the suspension mechanism for increasing pressure of the pressure medium within the pressure chamber in a first mode for increasing relative distance between the vehicle body and the suspension member, for decreasing the pressure of the pressure medium within the pressure chamber in a second mode for decreasing relative distance between the vehicle body and the suspension member and for maintaining the pressure of the pressure medium within the pressure chamber constant in a third mode, the pressure source circuit normally operating in the third mode;

a first sensor means for monitoring vehicle body height level to produce a first sensor signal indicative of the vehicle body height level;

a second sensor means for monitoring vehicle body attitude change to produce a second sensor signal indicative of magnitude of vehicle body attitude change;

a third detector means for detecting load change state to produce a third detector signal when load change state is detected;

a controlling means, active in a normal state mode in absence of the third detector signal, for controlling operation of the pressure source circuit on the basis of the first and second sensor signal values for adjusting the pressure in the pressure chamber for maintaining the vehicle body height level within a predetermined first height range and disabling the height adjustment when substantial attitude change is detected based on the second sensor signal, the controlling means being responsive to the third detector signal to operate in a load change transition mode, for controlling the pressure source means based on the first sensor signal value for adjusting pressure in the pressure chamber value so as to adjust vehicle body height level within a predetermined second height range irrespective of vehicular attitude change represented by the second sensor signal.

According to another aspect of the invention, an automotive height control system comprises:

a suspension mechanism interposed between a vehicle body and a suspension member which rotatably supports a vehicular wheel and including a pressure chamber variable of a pressure of pressure medium therewithin for adjusting relative distance between the vehicle body and the suspension member;

a pressure source circuit connected to the pressure chamber of the suspension mechanism for for increasing pressure of the pressure medium within the pressure chamber in a first mode for increasing relative distance between the vehicle body and the suspension member, for decreasing the pressure of the pressure medium within the pressure chamber in a second mode for decreasing relative distance between the vehicle body and the suspension member and for maintaining the pressure of the pressure medium within the pressure chamber constant in a third mode, the pressure source circuit normally operating in the third mode;

a first sensor means for monitoring relative distance between the vehicle body and the suspension member to produce a first sensor signal indicative of the monitored relative distance;

a second sensor means for monitoring vehicle body attitude change to produce a second sensor signal indicative of magnitude of vehicle body attitude change;

a third detector means for detecting the vehicle condition possibly causing change of load loaded on the vehicle, which load influences to vehicular height level, to produce a third detector signal when vehicle condition possibly causing load change is detected;

a controlling means, active in a normal state mode in absence of the third detector signal, for controlling operation of the pressure source circuit on the basis of the first and second sensor signal values for adjusting the pressure in the pressure chamber for maintaining the vehicle body height level within a predetermined first height range and disabling the height adjustment when substantial attitude change is detected based on the second sensor signal, the controlling means being responsive to the third detector signal to operate in a load change transition mode, for controlling the pressure source means based on the first sensor signal value for adjusting pressure in the pressure chamber so as to adjust vehicle body height level within a predetermined second height range irrespective of vehicular attitude change represented by the second sensor signal.

The third detector means may comprise a door switch which turns ON in response to opening of door. The controlling means is active in the load change transition mode for a predetermined period as triggered by the third detector signal. If necessary, the controlling means may derive the predetermined period on the basis of a difference between the first sensor signal value and a criterion defining the predetermined second height range.

DESCRIPTION OF THE PREFERRED EMBODIMENT

Figure 1:
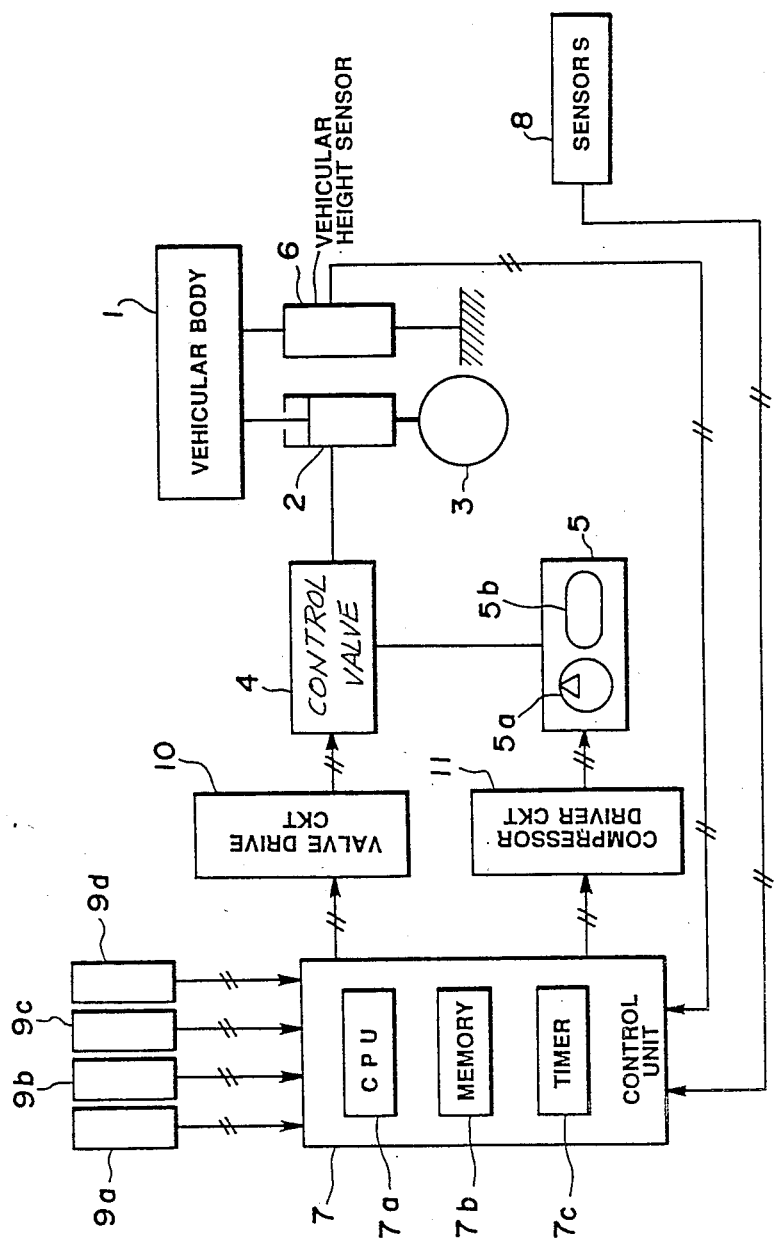
FIG. 1 is a schematic block diagram of the preferred embodiment of a height control system, according to the present invention.

Referring now to the drawings, particularly to FIG. 1, the preferred embodiment of a vehicular height control system, according to the present invention, has a pneumatic cylinder 2 which is disposed between a vehicular body 1 and a suspension member 3 which rotatably supports a road wheel. The pneumatic cylinder 2 has a pneuamtic chamber 2a connected to a pneumatic pressure source unit 5 which includes a compressor 5a and a reservoir tank 5b, via a pressure control valve 4. Therefore, by the operation of the present control valve 4, pneumatic pressure in the pneumatic pressure chamber 2a is adjusted so as to expand the distance between the vehicular body 1 and the suspension member 3 by increasing the pneumatic pressure and to decrease the distance by decreasing the pneumatic pressure. In order to perform the required pressure adjustment, the pressure control valve 4 may be designed as three way valve which is variable of the valve positions between an UP mode position in which the pneumatic pressure chamber 2a is communicated with the pressure source unit 5 to introduce the pneumatic pressure therefrom for increasing the pneumatic pressure in the pneumatic pressure chamber, a DOWN mode position, in which the pneumatic pressure chamber 2a is exposed to the atmosphere to vent the pressurized air or gas thereto for decreasing the pneumatic pressure in the pneumatic pressure chamber, and a SHUT position, in which the pneumatic chamber is blocked from communication to maintain the pneumatic pressure substantially constant.

In order to control operation of the pressure control valve 4, a microprocessor-based control unit 7 is provided. The control unit 7 generally comprises CPU 7a, a memory 7b including RAM and ROM, a timer 7c and an input/output interface 7d. The control unit 7 is connected to a vehicular height sensor 6. The vehicular height sensor 6 may comprise a stroke sensor disposed between the vehicular body and the suspension member, as shown in FIG. 1. The stroke sensor may comprise an optical sensor, a magnetic sensor, strain gauge and so forth. In the alternative, the vehicular height sensor may comprise a sensor which monitors vehicular height from a road surface. Such vehicular height sensor may comprise doppler sensor, ultrasonic sensor and so forth.

The vehicular height sensor 6 produces a vehicular height indicative signal. The control unit 7 is also connected to a plurality of door open detector switches 9a, 9b, 9c and 9d, each of which detects open condition of associated one of vehicular door to produce HIGH level door condition indicative signal. The control unit 7 is further connected to a vehicular attitude monitoring sensors which are generally represented by the reference numeral 8.

The attitude monitoring sensors 8 may be constituted of a rolling sensor, a pitching sensor and so forth. The rolling sensor may comprise a vehicle speed sensor and a steering angle sensor for detecting magnitude of rolling. The rolling sensor may also comprise a level acceleration sensor. On the other hand, the pitching sensor may comprise a brake switch for detecting vehicular braking state and whereby detecting vehicular decelerating condition, a longitudinal acceleration sensor, a fuel injection pulse sensor which counts the fuel injection pulses for detecting acceleration and deceleration of an automotive engine and whereby detecting acceleration and deceleration of the vehicle.

Since the kind of sensor or sensors for monitoring the vehicle driving parameter or parameters affecting vehicle body attitude is not essential to the shown embodiment of the vehicular height control system, those sensors will be generally referred to as the vehicular attitude monitoring sensor 8. Sensor signal produced by the vehicular attitude monitoring sensor 8 and representative of the vehicular attitude will be hereafter referred to as vehicular attitude indicative signal.

The control unit 7 is further connected to a compressor driver circuit 11 and a pressure control valve driver circuit 10. The control unit 7 is further connected to a pressure sensor 12 for monitoring pneumatic pressure in the reservoir tank 5b of the pressure source unit 5 to produce a pressure indicative signal. The control unit 7 is responsive to the pressure indicative signal value smaller than or equal to a predetermined low pressure criterion to produce a compressor control signal. The compressor control signal is fed to the compressor driver circuit 11. The compressor driver circuit 11 is responsive to the compressor control signal to drive the compressor 5a to increase the pressure in the reservoir tank.

It should be noted that though the shown embodiment is designed to drive the compressor 5a when the pneumatic pressure in the reservoir tank becomes lower than or equal to the low pressure criterion, it is possible to drive the compressor 5a whenever the pressure control valve 4 is operated into the UP mode position. In such case, the pressure sensor 12 in the reservoir tank will not be necessary.

Practical vehicular height control operation to be performed by the suspension control system set forth above will be discussed herebelow with reference to FIGS. 2 to 4.

Figure 2:
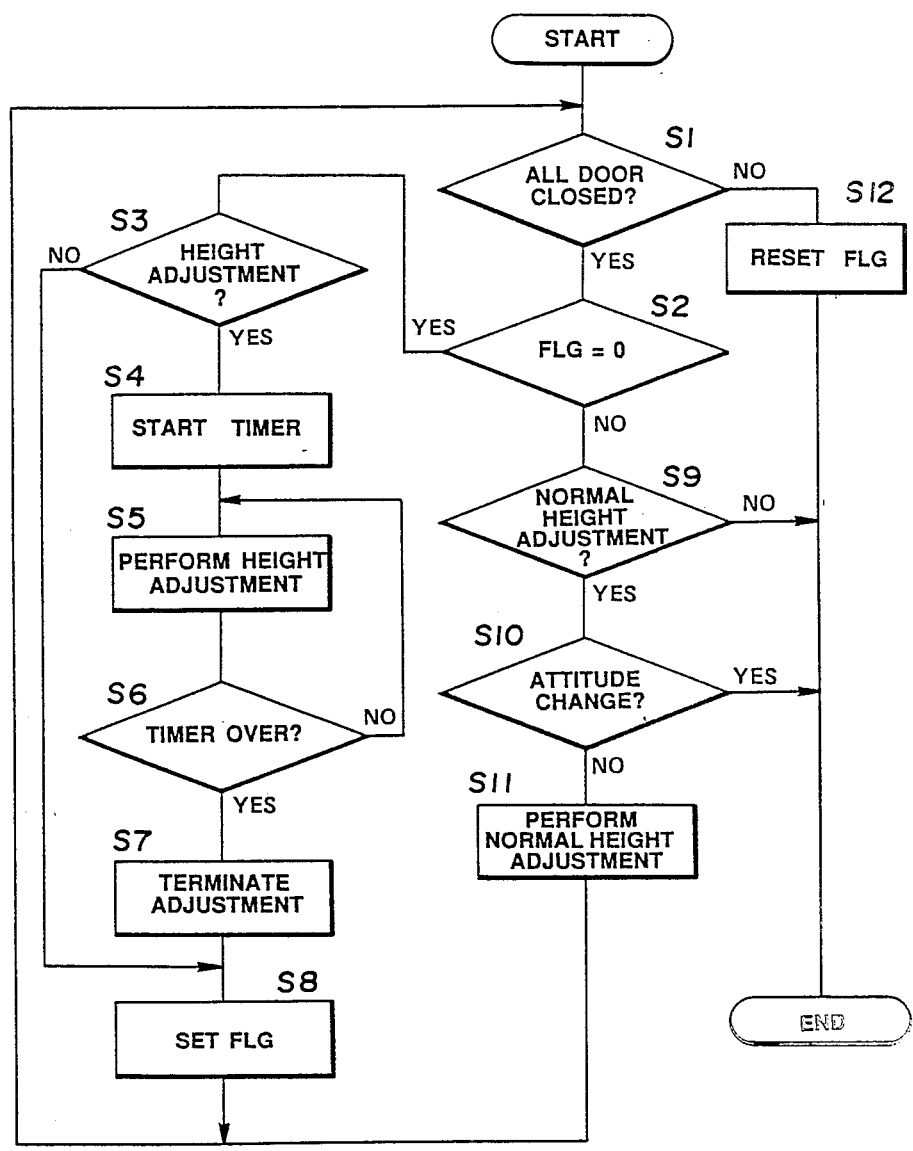
FIG. 2 is a flowchart of a vehicular height control program to be executed by a control unit in the vehicular height control system of FIG. 1.

FIG. 2 shows a height control program to be executed by the control unit 7 in the preferred embodiment of the height control system of FIG. 1.

Immediately after starting execution, the door condition indicative signals from the door open detector switches 9a, 9b, 9c and 9d are checked at a step S1. This stage is provided for detecting load change state of the vehicle by detecting door opening. in the shown embodiment, the system recognizes that the load on the vehicle will be increased by boarding of one or more passengers at the first occurrence of HIGH level door condition indicative signal and that the load on the vehicle will be decreased by unboarding or getting off of one or more passengers at the second occurrence of HIGH level door condition indicative signal.

If any one of the door condition indicative signals of the door open detective switches 9a, 9b, 9c and 9d is detected at the step S1, process goes to a step S12 to reset a load change transition indicative flag FLG. Thereafter, process goes to END.

On the other hand, when all of the door condition indicative signals of the door open detective switch 9a, 9b, 9c and 9d are maintained at LOW level as checked at the step S1, the load change transition state indicative flag FLG is checked at a step S2. When the load change transition indicative flag FLG is not set as checked at the step S2, the vehicular height indicative signal value is then checked to detect the vehicular vehicular height level at a step S9. Namely, at the step S9, the vehicular height indicative signal value is compared with an upper threshold value representative of an upper limit of a predetermined normal state height range and a lower threshold representative of a lower limit of the predetermined normal state vehicular height range.

It should be noted that the aforementioned normal state height range is set in relation to a predetermined target height and defined by the aforementioned upper and lower limit with taking the target height as the center value.

When the vehicular height indicative signal value is smaller than or equal to the upper threshold and greater than or equal to the lower threshold, process goes to END. On the other hand, when the vehicular height indicative signal value is greater than the upper threshold or smaller than the lower threshold, the vehicular attitude indicative signal is checked at a step S10. When the vehicular attitude indicative signal as checked at the step S10 indicates vehicular attitude change, process goes END. When the vehicular attitude indicative signal as checked at the step S10 indicative that the vehicular attitude is held unchanged, then height adjustment is performed by outputting the height control signal to the pressure control valve driver circuit 10 at a step S11. Namely, when the vehicular height indicative signal is greater than the upper threshold, the control signal serves as DOWN command ordering DOWN mode position of the pressure control valve 10. On the other hand, when the vehicular height indicative signal value is smaller than the lower threshold, the control signal serves as UP command ordering UP mode position of the pressure control valve 10. After the process at the step S11, process returns to the step S1.

When the load change transition indicative flag FLG is not set as checked at the step S2, the vehicular height indicative signal value is compared with an upper criterion which defines an upper limit of a predetermined transition state height range and a lower criterion which defines a lower limit of the transition state height range. The transition state height range is set wider than the normal state height range.

When the vehicular height indicative signal value is greater than the upper criterion or smaller than the lower criterion as checked at the step S3, a timer 7c is triggered to start measurement of an elapsed time. Then, transition state height adjustment is performed at a step S5 to adjust the vehicular height within the transition state height range 5. In the transition state height adjustment, the vehicular height is adjusted toward the upper or lower limit of the transition state height range. Namely, when the vehicular height is higher than the upper limit, then, the control signal serving as DOWN command is output to operate the pressure control valve 10 to the DOWN mode position to vent the pressure in the pneumatic chamber 2a of the pneumatic chamber. The DOWN mode ordering control signal is maintained until the vehicular height becomes lower than or equal to the upper limit of the transition state height range. On the other hand, when the vehicular height is lower than the lower limit, the control signal serving as UP command is produced to operate the pressure control valve 10 to the UP mode position. By this, the pressure is introduced from the pneumatic pressure source unit 5 to rise the vehicular height. The UP mode ordering control signal is terminated when the vehicular height increases across the lower limit of the transition state height range.

Thereafter, the timer value of the timer 7c as triggered at the step S4 is checked at a step S6. When the timer value is smaller than a predetermined value representative of a predetermined period of time in which the transition state height adjustment is to be performed, process returns to the step S5. On the other hand, when the timer value becomes greater than or equal to the predetermined value as checked at the step S6, then, transition state height adjustment is terminated irrespective of vehicular height position, at a step S7. Namely, when time over is detected at the step S6, the transition state height adjustment is terminated even when the vehicular height is still out of the transition state height range.

After the process of the step S7 or when the vehicular height indicative signal value is smaller than or equal to the upper criterion and greater than or equal to the lower criterion, the load change transition indicative flag FLG is set to indicate that the state of the height control is not in the load change transition state, at a step S8. Thereafter, process returns to the step S1.

In the preferred height control process set forth above, the timer 7c is designed to detect the fixed transition state height adjustment period so that the transition state height adjustment is performed within the fixed period. However, it may be possible to vary the transition state height adjustment period so that transition state height adjustment can be completed within period while the transition state height adjustment is active.

Figure 3:
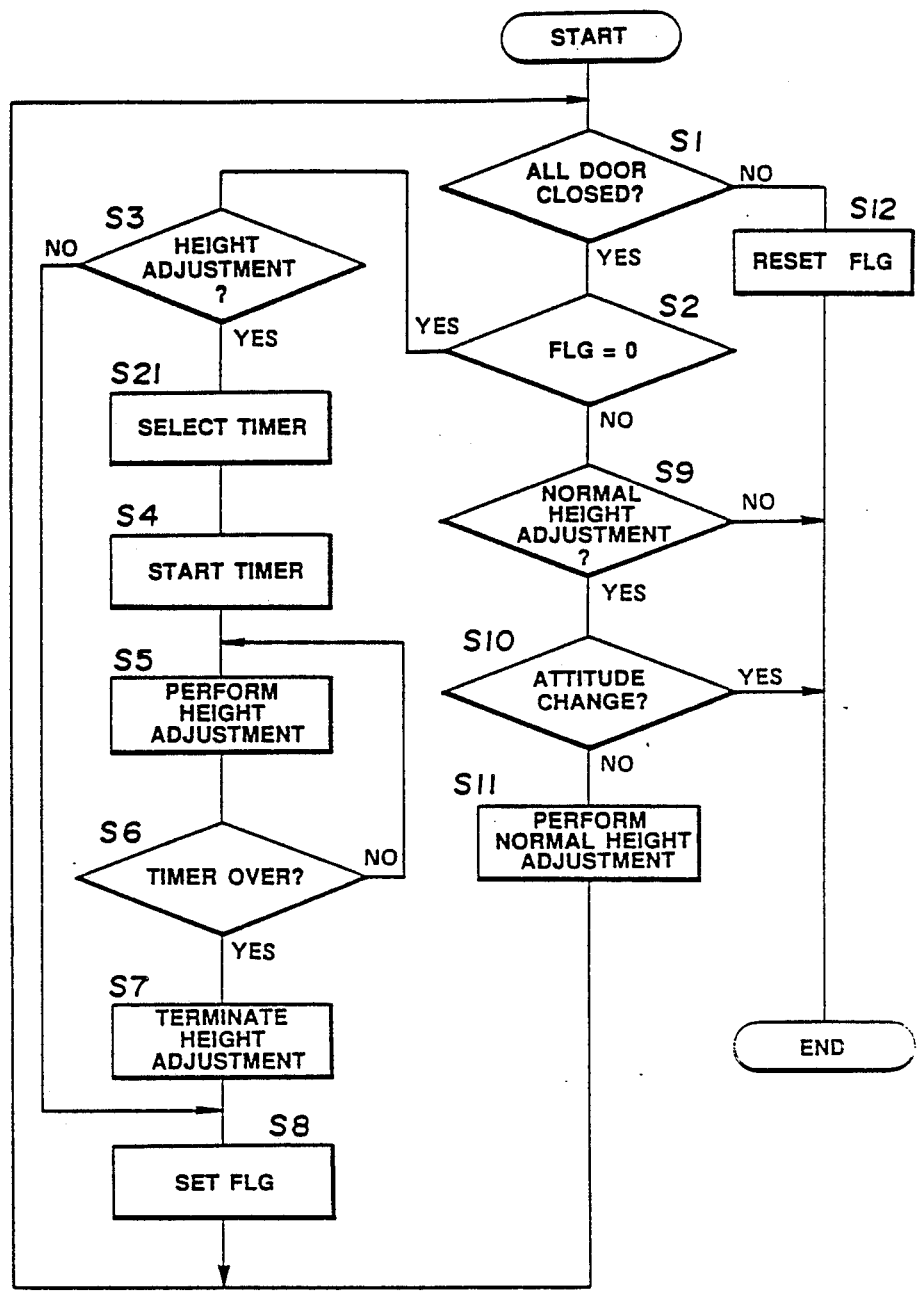
FIG. 3 is a flowchart of another embodiment of a vehicular height control program to be executed by the control unit.
Figure 4:
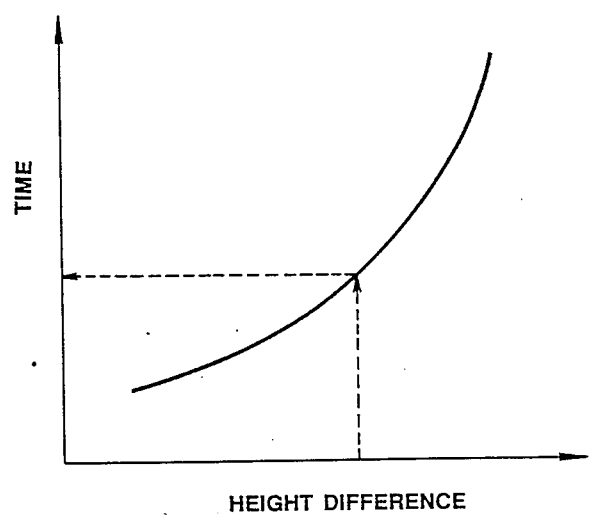
FIG. 4 is a chart showing variation of a period of time in which the vehicular height is to be maintained at the temporarily adjusted level, in relation to a difference of the vehicular height in relation to the predetermined height criterion.

FIG. 3 shows modification of the height control program of FIG. 2. In the modified routine in FIG. 3, the feature of adjustment of the transition state height adjustment period depending upon the height difference between the actual vehicular height and the upper or lower limit of the transition state height range, is introduced.

In order to introduce height difference dependent variable transition state height adjustment period, a step S21 is added between the steps S3 and S4. In the step S21, the height difference from the adjacent one of upper and lower limit of the transition state height range is derived. Based on the derived height difference, the timer set value which is representative of the transition state height adjustment period, is determined according to the characteristics shown in FIG. 4.

By introducing this feature, it can be assured to complete transition state height adjustment within the period, in which the transition state height adjustment is active.

While the present invention has been disclosed in detail in terms of the preferred embodiment of the invention, the invention can be implemented in various ways. Furthermore, various modifications of the shown embodiment can be embodied without departing from the principle of the invention. Therefore, the invention should be appreciated to include possible all embodiments and modifications of the shown embodiments, which can be implemented without departing from the principle of the invention set out in the appended claims.

For example, though the shown embodiment employs the pneumatic cylinder for adjusting the vehicular height, it may be possible to use hydraulic or hydro-pneumatic cylinder for adjusting the height level of the vehicular body. Naturally, when hydraulic cylinder is used for height adjustment, the pressure chamber in the hydraulic cylinder is to be connected to a hydraulic pressure source. Furthermore, though the shown embodiment employs the vehicular height sensor for monitoring the vehicular height level, a vertical acceleration sensor monitoring vehicle body acceleration in vertical direction can be employed in place thereof for detecting vertical displacement of the vehicular height. In such case, the vertical height position may be derived by integrating the vertical acceleration indicative signal values.

As will be appreciated herefrom, the present invention fulfills all of the objects and advantages sought therefor.

What is claimed is:

1. An automotive height control system comprising:
a suspension mechanism interposed between a vehicle body and a suspension member which rotatably supports a vehicular wheel and including a pressure chamber variable of a pressure of pressure medium therewithin for adjusting relative distance between said vehicle body and said suspension member;
a pressure source circuit connected to said pressure chamber of said suspension mechanism for increasing pressure of said pressure medium within said pressure chamber in a first mode for increasing relative distance between said vehicle body and said suspension member, for decreasing the pressure of said pressure medium within said pressure chamber in a second mode for decreasing relative distance between said vehicle body and said suspension member and for maintaining the pressure of said pressure medium within said pressure chamber constant in a third mode, said pressure source circuit normally operating in a third mode;
a first sensor means for monitoring vehicle body height level to produce a first sensor signal indicative of said vehicle body height level;
a second sensor means for monitoring vehicle body attitude change to produce a second sensor signal indicative of magnitude of vehicle body attitude change;
a third detector means for detecting load change state to produce a third detector signal when load change state is detected;
a controlling means, active in a normal state mode in absence of said third detector signal, for controlling operation of said pressure source circuit on the basis of said first and second sensor signal values for adjusting the pressure in said pressure chamber for maintaining the vehicle body height level within a predetermined first height range and disabling the height adjustment when substantial attitude change is detected based on said second sensor signal, said controlling means being responsive to said third detector signal to operate in a load change transition mode, for controlling said pressure source means based on said first sensor signal value for adjusting pressure in said pressure chamber so as to adjust vehicle body height level within a predetermined second height range irrespective of vehicular attitude change represented by said second sensor signal.

2. An automotive height control system as set froth in claim 1, wherein said third detector means comprises a door switch which turns ON in response to opening of door.

3. An automotive height control system as set forth in claim 1, wherein said controlling means is active in the load change transition mode for a predetermined period as triggered by said third detector signal.

4. An automotive height control system as set forth in claim 3, wherein said controlling means derives the predetermined period on the basis of a difference between the first sensor signal value and a criterion defining the predetermined second height range.

5. An automotive height control system as set forth in claim 1, wherein said first sensor means is designed to monitor relative distance between said vehicular body and said suspension member for producing said first sensor signal indicative of the relative distance as the vehicle height level indicative data.

6. An automotive height control system comprising:
a suspension mechanism interposed between a vehicle body and a suspension member which rotatably supports a vehicular wheel and including a pressure chamber variable of a pressure of pressure medium therewithin for adjusting relative distance between said vehicle body and said suspension member;
a pressure source circuit connected to said pressure chamber of said suspension mechanism for increasing pressure of said pressure medium within said pressure chamber in a first mode for increasing relative distance between said vehicle body and said suspension member, for decreasing the pressure of said pressure medium within said pressure chamber in a second mode for decreasing relative distance between said vehicle body and said suspension member and for maintaining the pressure of said pressure medium within said pressure chamber constant in a third mode, said pressure source circuit normally operating in said third mode;
a first sensor means for monitoring relative distance between said vehicle body and said suspension member to produce a first sensor signal indicative of the monitored relative distance;
a second sensor means for monitoring vehicle body attitude change to produce a second sensor signal indicative of magnitude of vehicle body attitude change;
a third detector means for detecting the vehicle condition possibly causing change of load loaded on the vehicle, which load influences to vehicular height level, to produce a third detector signal when vehicle condition possibly causing load change is detected;
a controlling means, active in a normal state mode in absence of said third detector signal, for controlling operation of said pressure source circuit on the basis of said first and second sensor signal values for adjusting the pressure in said pressure chamber for maintaining the vehicle body height level within a predetermined first height range and disabling said height adjustment when substantial attitude change is detected based on said second sensor signal, said controlling means being responsive to said third detector signal to operate in a load change transition mode, for controlling said pressure source means based on said first sensor signal value for adjusting pressure in said pressure chamber so as to adjust vehicle body height level within a predetermined second height range irrespective of vehicular attitude change represented by said second sensor signal.

7. An automotive height control system as set forth in claim 6, wherein said third detector means comprises a door switch which turns ON in response to opening of door.

8. An automotive height control system as set forth in claim 7, wherein said controlling means is active in said load change transition mode for a predetermined period as triggered by said third detector signal.

9. An automotive height control system as set forth in claim 8, wherein said controlling means derives said predetermined period on the basis of a difference between said first sensor signal value and a criterion defining said predetermined second height range.

* * * * *